United States Patent [19]

Nagasaki et al.

[11] Patent Number: 4,633,303

[45] Date of Patent: Dec. 30, 1986

[54] TWO-DIMENSIONAL BANDWIDTH COMPENSATING CIRCUIT FOR AN ENDOSCOPE USING A SOLID STATE IMAGE PICK-UP DEVICE

[75] Inventors: Tatsuo Nagasaki, Musashino; Hiroyoshi Fujimori, Hachioji, both of Japan

[73] Assignee: Olympus Optical Co., Ltd., Tokyo, Japan

[21] Appl. No.: 771,452

[22] Filed: Aug. 30, 1985

[30] Foreign Application Priority Data

Aug. 31, 1984 [JP] Japan ................ 59-183082

[51] Int. Cl.⁴ .............. A61B 1/04; A61B 1/06; H04N 5/14
[52] U.S. Cl. ..................... 358/98; 128/6; 358/138; 358/160
[58] Field of Search ........... 358/98, 138, 133, 160, 358/1, 11; 128/4–11

[56] References Cited

U.S. PATENT DOCUMENTS

| Re. 31,289 | 6/1983 | Moore et al. | 128/6 |
| Re. 31,290 | 6/1983 | Moore et al. | 128/6 |
| 4,480,636 | 11/1984 | Karaki | 358/98 |
| 4,551,753 | 11/1985 | Nishizawa | 358/138 |

FOREIGN PATENT DOCUMENTS 53-36885  3/1978  Japan.

Primary Examiner—Howard W. Britton
Attorney, Agent, or Firm—Armstrong, Nikaido, Marmelstein & Kubovcik

[57] ABSTRACT

In an endoscope using for an imaging means a solid state image pick-up device with light receiving elements arranged two-dimensionally, deterioration of the imaging resolution two-dimensionally is prevented by providing frame memories to read the imaging signals time-serially along each array direction of the light receiving elements, low pass filters to cut the higher harmonics in the signals read time-serially along each array direction and bandwidth compensating circuits to compensate the bandwidths in each array direction.

5 Claims, 14 Drawing Figures

TWO-DIMENSIONAL BANDWIDTH COMPENSATING CIRCUIT FOR AN ENDOSCOPE USING A SOLID STATE IMAGE PICK-UP DEVICE

FIELD OF THE INVENTION AND RELATED ART STATEMENT

This invention relates to a two-dimensional bandwidth compensating circuit applicable to endoscopes using solid state image pick-up devices, for preventing deterioration of image resolution.

Recently, various endoscopes using a solid state image pick-up device such as a charge coupled device (CCD) as imaging means have been proposed.

Such solid state image pick-up devices when used for the imaging means provide the advantages that it is easy to record and reproduce picture images, and signal processing such as enlargement or reduction of the picture images can be easily done. As the integrating technology progresses, picture images with more and more picture elements and high resolution can be realized. For example, Japanese Utility Model Journal No. 53-36885 discloses an endoscope using a solid state image pick-up device as its image means and adopting a color surface sequence type illuminating means. U.S. Reissue Pat. Nos. Re. 31289 and Re. 31290 also disclose endoscopes using solid state image pick-up devices. But with the imaging means using the solid state image pick-up device, approximately as in the case of an optical fiber bundle, bandwidth deterioration occurs in the imaged picture image for the reasons described below because the light receiving elements (picture elements) have finite apertures.

For simplicity, explanation will be made in respect to only one dimension. Assume that the luminance distribution f1(x) in an array dimension (e.g. horizontal direction) of the light receiving elements for a subject image formed on the imaging surface of a solid state image pick-up device by an image forming optical system (not illustrated) is as shown by FIG. 1(a), and that the spatial frequency components F1 (k) expressed through Fourier transformation are as shown by FIG. 1(b).

If an image is picked up by a solid state image pick-up device with light receiving elements arranged on the imaging surface at a pitch of $\tau$ and with the aperture (light receiving element face) infinitesimal, i.e. a solid state image pick-up device having light receiving characteristics like the shear function (or comb function $$\left[ \mathcal{J}(x) \left( = \sum_{-\infty}^{\infty} \delta(n - x/\tau) \right) \right]$$

with the delta functions arranged comb-tooth-like as shown in FIG. 1(c) (the Fourier-transformed components S(k) of the shear function $\mathcal{J}(x)$ will have the interval of $1/\tau$), its (photoelectric conversion) luminance distribution f2(x) will be as shown in FIG. 1(e). That is, the luminance distribution f2(x) is the product of the luminance distribution f1(x) and shear function $\mathcal{J}(x)$. The Fourier-transformed component F2(k) of the luminance distribution f2(x) will be as shown in FIG. 1(f). That is, the spatial frequency component F1(k) of the luminance distribution f1(x) of the subject image appears as a side band every $1/\tau$ spatial frequency. The Fourier-transformed component F2(k) is expressed by the composite product of the Fourier-transformed components through frequency convolution integration as follows.

$$F2(k) = \mathcal{F}\{f1(x) \times \mathcal{J}(x)\} = F1)k) * S(k)$$

Where $\mathcal{F}$ is the Fourier transformation symbol.

When an image is picked up by a solid state image pick-up device having a light receiving element array arranged at a pitch of $\tau$ and with an infinitesimal aperture, the spatial frequency components will be as shown in FIG. 1(f), and therefore, if the first side band only is taken out by a low pass filter having a sharp cut-off characteristic at $1/(2\tau)$ as shown by the broken line of FIG. 1(f), ideal subject signals can be obtained (provided that the spatial frequency component of the subject image is less than the Nyquist threshold frequency of $1/(2\tau)$.

In the above case, however, since the aperture is infinitesimal, the amplitude of the signal becomes infinitesimal even if only the first side band is taken out, and therefore, this method is not practical. (In FIG. 1(f) the amplitude is standardized at 1.)

For the actual picture elements of an image pick-up device, an aperture near to the picture element pitch is provided to obtain necessary sensitivity, and the photoelectrically converted and output video signals are sample-held by a later-stage circuit and become a luminance distribution of a step waveform. The luminance distribution is expressed as follows.

As shown in FIG. 1(g), if a rectangle function (or gating function) re(x) having a constant value only in a section of the pitch $\tau$ is introduced, the Fourier-transformed Re(k) of the function re(x) becomes a sink function which smoothly decreases and becomes 0 (zero) at $k=1/\tau$, and in this case, with the Nyquist threshold frequency of $k=1/(2/\tau)$, it becomes a value about 4 dB lower than the value at $k=0$.

By the way, the luminance distribution f3(x) for an image picked up by a solid state image pick-up with light receiving elements arranged almost in contact with one another with the aperture being $\tau$ becomes a step waveform as shown in FIG. 1(i). The luminance distribution of the step waveform is given as follows.

$$f3(x) = [f1(x) \times \mathcal{J}(x)] * re(x)$$

The Fourier-transformed component F3(k) of he luminance distribution f3(x) is given by $[F3(k) * S(k)] \times Re(k)$ as shown in FIG. 1(j), and it becomes gradually lower on the high frequency component side than those shown in FIGS. 1(b) and 1(f) and such bandwidth deterioration as a decrease of about 4dB for the Nyquist threshold frequency will occur.

The above explanation was made for one-dimension in the horizontal direction, but in the vertical direction, band deterioration also occurs on the high bandwidth side and especially the luminance component for minute regions greatly decreases and the resolution decreases. Therefore, it poses a serious problem when accurate diagnosis must be made. In such a case, even if the video signals to be displayed are uniformly enlarged, only the contrast is changed and the resolution cannot be improved.

OBJECT AND SUMMARY OF THE INVENTION

An object of this invention is to provide a two-dimensional bandwidth compensating circuit, for endoscopes using a solid state image pick-up device, which prevents deterioration of the imaging resolution.

Another object of this invention is to provide a two-dimensional bandwidth compensating circuit, for endoscopes using a solid state image pick-up device, which can be realized with a simple configuration.

This invention relates to an endoscope using as the imaging means a solid state image pick-up device with light receiving elements arranged two-dimensionally and regularly, and which is provided with a frame memory for temporary signal storage, a signal processing circuit for reading signals time-serially along each two-dimensional array direction of the light receiving elements, a means for eliminating the high harmonics from the signals read time-serially and a means for bandwidth compensation in each array direction.

BRIEF DESCRIPTION OF DRAWINGS

FIG. 2 is a block diagram showing the signal processing section provided in the embodiment, FIG. 3 is a block diagram showing an endoscope provided with the embodiment, FIG. 4 is a block diagram showing the bandwidth compensating circuit related to the embodiment, and FIG. 5 is a diagram showing the gain (amplitude) vs. frequency characteristic of the bandwidth compensating circuit in FIG. 4.

DETAILED DESCRIPTION OF THE PREFERRED EMBODIMENT

Figure 1:
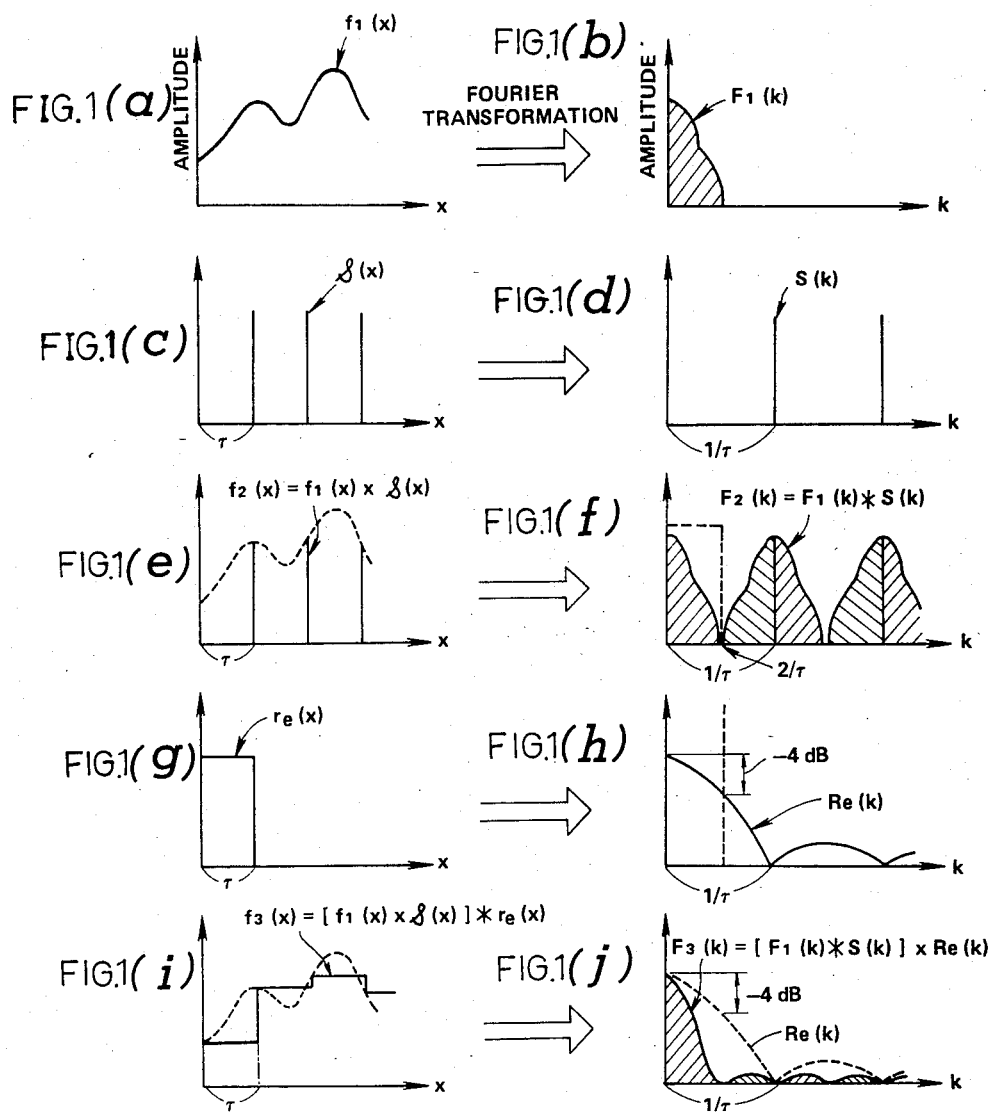
FIGS. 1a, 1b, 1c, 1d, 1e, 1f, 1g, 1h, 1i and 1j are characteristic diagrams explaining how the imaging resolution is decreased due to bandwidth deterioration, etc. when an image is picked up by a solid state image pick-up device.
Figure 2:
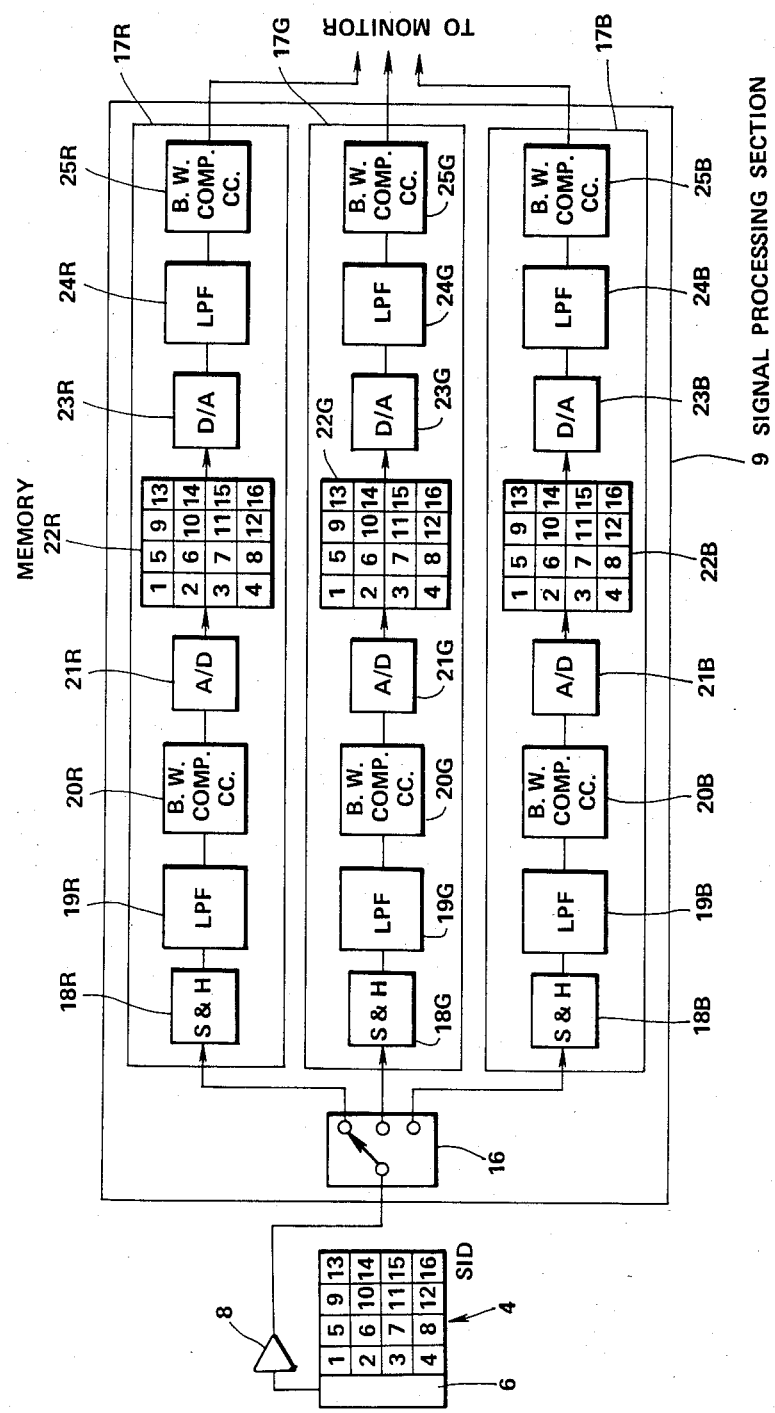
FIGS. 2 to 5 relate to one embodiment of the present invention.
Figure 3:
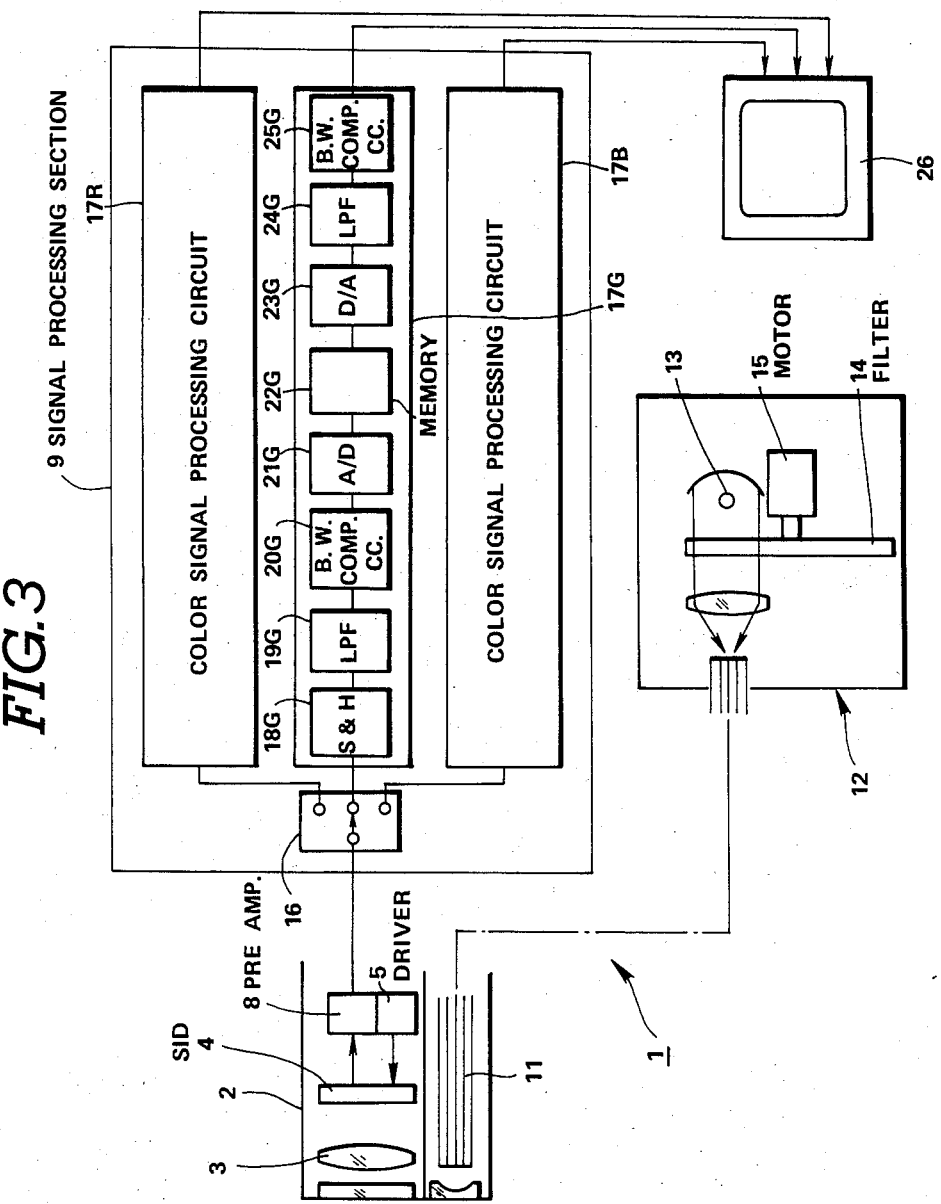

As shown in FIG. 3, an endoscope 1 provided with one embodiment of the present invention has an image-forming object lens 3 provided at the front end side of a long narrow insertion part 2 which can be inserted into a body cavity, etc. and a solid state image pick-up device (SID) 4 is arranged so that its imaging surface will be at the focal plane of the object lens 3. The solid state image pick-up device 4 has many light receiving elements, for performing a photoelectric conversion function, regularly arranged vertically and horizontally, and by means of a clock signal applied thereto from a driver circuit 5, the picture element signals from a shift register 6 of solid state image pick-up device 4 are output time-serially ("clocked out") in the vertical sequence indicated by the numbers 1, 2, 3, 4, 5 ... 16 as shown in FIG. 2.

In FIG. 2, the number of picture elements in the array is shown as 4×4 (=16) for simplification.

The picture element signals output from the solid state image pick-up device 4 are amplified by a preamplifier 8 and input to a signal processing section 9 in operable connection via a cable provided in the insertion part 2.

By the way, the insertion part 2 includes a light guide 11, made of a flexible optical fiber bundle, as a means for transmitting illuminating light, and the rear end of the light guide 11 can be connected detachably to a light source device 12. The illuminating light of a light source lamp 13 in the light source device 12 is sequentially changed into light of each wavelength of red, green and blue via rotary color filter 14 consisting of 3-color (red, green and blue) transmission filters, condensed by a condenser lens, irradiated into the rear end (incident end) of the light guide 11, and irradiated color-sequentially onto the subject via a light distributing lens at the front end of the light guide 11. The rotary color filter 14 is driven, for example, by a stepping motor 15.

The signals input to the signal processing section 9 are input to color signal processing circuits 17R, 17G and 17B via a multiplexer 16 which is switched in synchronism with the color-sequential illumination. The color signal processing circuits 17R, 17G and 17B have the same block configuration. The input signals are sample-held by sample holding circuits 18R, 18G and 18B therein, sharply cut at the Nyquist threshold frequency ($\frac{1}{2}\tau$) by low pass filters 19R, 19G and 19B therein to remove the higher harmonics which cause deterioration of resolution and to smooth the signal waveform, and then input to first bandwidth compensating circuits 20R, 20G, and 20B. The bandwidth compensating circuits (represented by the symbol 20, which notation is also used for other symbols) compensate the vertical frequency band characteristics deteriorated by the vertical aperture of the element areas of the light receiving elements, by the sample-holding circuits 18, and by the cut-off characteristics of the low pass filters 19. Then, the signals from band with compensating circuits 20 are A/D converted by A/D converters 21R, 21G and 21B and stored vertically, as shown in FIG. 2, in frame memories 22R, 22G and 22B used as temporary signal storage means. When the stored signals are read from the frame memories 22 for display, they are read horizontally (in a dimensional direction different from that for reading signals from the light receiving elements) as time-serial signals in the sequence of 1, 5, 9, 13, 26, ... 16. The stored signals are read simultaneously from the three frame memories 22R, 22G and 22B and D/A converted by D/A converters 23R, 23G and 23B to provide the color signals R, G and B. The color signals R, G and B are smoothed with the unnecessary higher harmonics being cut at the horizontal Nyquist threshold frequency (equal to that in the vertical direction in this case) by low pass filters 24R, 24G and 24B, and are input to the second bandwidth compensation circuits 25R, 25G and 25B. The bandwidth compensating circuits 25 compensate the horizontal frequency bandwith of the received signals deteriorated by the horizontal apertures, by the cut-off characteristics of the low pass filters 24, etc., and then the signals are displayed as a color picture on a TV display monitor 26 (e.g., an RGB monitor).

The embodiment of the present invention with such a configuration and operation can two-dimensionally correct the resolution (spatial frequency characteristics) deteriorated by the apertures and other parts of the signal processing section 9.

The following will explain the specific configuration and operation of the bandwidth compensating circuits 20 (25) for compensating the characteristics in each array dimension (direction).

Figure 4:
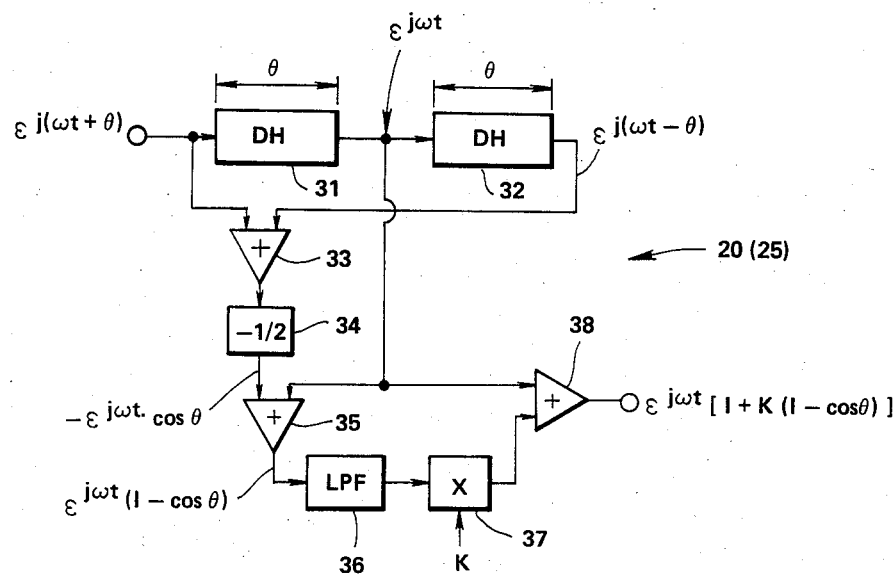

As shown in FIG. 4, the bandwidth compensating circuit 20 (25) consists of first and second delay lines (DH) 31 and 32 for delaying the input signals, an adder circuit 33 for adding the input signal with the output signal of the delay lines 31 and 32 connected in series, a ½ inverter (halver-inverter) 34 for halving and inverting the output of the adder 33, an adder circuit 35 for adding the output signal of the halver-inverter 34 with the output signal from the first delay line 31, and an adder circuit 38 to add the signal output by the adder circuit 35 and passed through a low pass filter 36 and a multiplier 37 (or amplifier) with the signal output via the first delay line 31.

The delay lines 31 and 32 provide a delay, the phase delay amount of which is approximately $\pi$, to an input signal near to the Nyquist threshold frequency.

The following will explain the operation of the bandwidth compensating circuit 20 (25).

Assuming that the part of the video input signal dependent on time is $e^{j(\omega t+\theta)}$ and the delay amount (phase delay) of the delay lines 31 and 32 at the angular frequency $\omega$ is $\theta$, the output of the delay line 31 is $e^{j\omega t}$ and the output of the delay line 32 is $e^{j(\omega t-\theta)}$.

Therefore, the output of the halver-inverter 34 via the adder 33 is: $-e^{j\omega t} \cdot (e^{j\theta} + e^{-j\theta})/2 = -e^{j\omega t} \cos\theta$ and the output of the adder 35 is:

$$e^{j\omega t} - e^{j\omega t} \cdot \cos\theta e^{j\omega t}(1-\cos\theta)$$

This value is multiplied by a proper value K by the multiplier 37 and the sum thereof with the output of the delay line 31 is provided by the adder 38 as follows:

$$e^{j\omega t} \cdot [1 + K(1-\cos\theta)]$$

Figure 5:
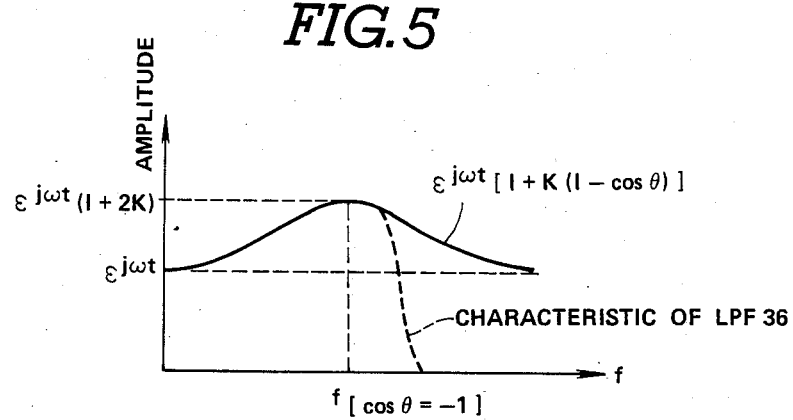

This function is plotted as shown in FIG. 5, and indicates that the amplitude is greatest for the frequency of $\cos\theta = -1$. The value is $e^{j\omega t} \cdot (1+2K)$ and by adjusting the value K, the correction amount is determined, and by means of the phase delay amount $\theta$, the highest frequency is determined.

Therefore, if the phase amount delay of the delay lines 31 and 32 is set at $\theta = \pi$, which gives the highest amplitude vs. signal frequency near the Nyquist threshold frequency, and K is set at a proper value, then the deterioration due to the apertures can be corrected and a signal output (picture image) with good resolution can be obtained. By setting the phase delay amount and K at proper values, the deterioration due to the apertures and filter characteristics can be effectively corrected. If the bandwidth compensation is strongly applied, two-dimensional contour emphasis can be obtained.

In FIG. 2 or FIG. 3, the sample-hold circuit 18, etc. can be commonly used. That is, the output signals of the preamplifier 8 can be sample-held by a common sample-hold circuit 18, the higher harmonics can be cut off by a common low pass filter 19, and subsequently the signals can be passed through a common bandwidth compensating circuit 20 and A/D converted by a common A/D converter 21, and then can be written in any of the frame memories which are selected by the multiplexer 16.

In the aforementioned embodiment, the light receiving elements are equally arranged both vertically and horizontally but this invention is not limited to such arrangement, and the vertical and horizontal array pitches of the light receiving elements can be different.

In such a case, use can be made of low pass filters 19 and 24 characterized in that they cut off approximately at the Nyquist threshold frequency specified by the array pitch in each dimensional direction. The bandwidth compensating circuits 20 and 25 should preferably be set so that the approximately largest amplitude or gain is provided for signals having a frequency near the Nyquist threshold frequency specified by each array pitch.

This invention is not limited to a method for imaging a subject illuminated by illuminating light of each color, and it can also be applied to a method for imaging a subject under the illumination of white light.

It can also be applied to monochrome imaging, in which case the multiplexer 16 is not required.

It can also be applied to a signal processing means having a means for interpolating in either dimensional direction what is imaged by the light receiving elements (which may or may not be equal in number vertically and horizontally).

In the aforementioned embodiment, the bandwidth compensating circuits 20 and 25 are arranged after the low pass filters 19 and 24 (which are provided to eliminate the higher harmonics), but this invention is not limited to this arrangement and includes the reversed arrangement. The bandwidth compensating circuits 20 or 25 are not limited to those shown in FIG. 4 and known circuit configurations can also be used. In some cases where the frequency characteristics of the bandwidth compensating circuits 20 or 25 are such that a sharp decrease occurs on a higher side than the Nyquist threshold frequency, the low pass filter 19 or 24 may not be required.

According to this invention, as aforementioned, the time-serial video signals are read from the solid state image pick-up device and written into and read from the frame memories in the two-dimensional vertical and horizontal array directions of the light receiving elements of the solid state image pick-up device, smoothed by the low pass filters and compensated for the light receiving area of each light receiving element and the filter characteristics by the bandwidth compensating means, thus making it possible to obtain a picture quality with good resolution. It also has the advantages that the configuration is simple and the cost is low.

It will be appreciated that various embodiments of wide scope can be practiced formed on the basis of this invention without departing from the spirit and scope of this invention.

This invention is not restricted by its particular embodiments except by the accompanying claims.

We claim:

1. In an endoscope having an insertion part insertable into a body cavity and the like, illuminating means provided at a front end of said insertion part for projecting illuminating light onto a subject to be imaged, an image-forming optical system arranged at said front end of said insertion part for forming an image of a subject, imaging means including a solid state image pick-up device having a two-dimensional array of a plurality of photoelectric picture elements arranged at a focal plane of said image-forming optical system for picking-up a subject image formed by said image-forming optical system, and display means for displaying subject image signals from said imaging means on a display monitor, a two-dimensional bandwidth compensating circuit provided in operable connection between said imaging means and said display means for compensating for deterioration of image signal resolution from said imaging means occurring in the two dimensions of said two-dimensional array of picture elements of said imaging means due to two-dimensional finiteness of the optical apertures of said picture elements, said two-dimensional bandwith compensating circuit comprising:

first reading means in operable connection with said two-dimensional array of picture elements of said imaging means for time-serially reading-out signals from said picture elements thereof along a first array dimension of said two-dimensional array of picture elements;

sample-hold circuit means in operable connection with said first reading means for sampling and holding said time-serially read-out signals output from said first reading means;

first low pass filter means in operable connection with an output of said sample-hold circuit means for eliminating higher harmonics from signals output from said sample-hold circuit means, said first low pass filter means having a sharp cutoff characteristic at a first Nyquist threshold frequency determined by the array pitch in a first dimension of said of said two-dimensional array of picture elements of said imaging means;

first bandwidth compensating means in operable connection with an output of said first low pass filter means for compensating for bandwidth deterioration of signals output from said first low pass filter means occurring near said first Nyquist threshold frequency;

analog-to-digital conversion means in operable connection with an output of said first bandwidth compensating means for converting signals output from said first bandwidth compensating means into digital signal values corresponding thereto;

frame memory means in operable connection with an output of said analog-to-digital conversion means for storing said digital signal values;

second reading means in operable connection with said frame memory means for time-serially reading-out said stored digital signal values from said frame memory along a second array dimension of said two-dimensional array of picture elements;

digital-to-analog conversion means in operable connection with said second reading means for converting said time-serially read-out digital signal values into analog signal values corresponding thereto;

second low pass filter means in operable connection with an output of said digital-to-analog conversion means for eliminating higher harmonics from said analog signal values, said second low pass filter means having a sharp cutoff characteristic at a second Nyquist threshold frequency determined by the array pitch of said picture elements in a second dimension of said two-dimensional array of picture elements; and second bandwidth compensating means in operable connection with an output of said second low pass filter means for compensating for bandwidth deterioration of signals output from said secon low pass filter means occurring near said second Nyquist threshold frequency, and outputting two-dimensionally bandwidth-compensated image signals for application to said display means.

2. The two-dimensional bandwidth compensating circuit in accordance with claim 1, wherein said first bandwidth compensating means provides maximum signal gain at said first Nyquist threshold frequency.

3. The two-dimensional bandwidth compensating circuit in accordance with claim 1, wherein said second bandwidth compensating means provides maximum signal gain at said second Nyquist threshold frequency.

4. The two-dimensional bandwidth compensating circuit in accordance with claim 1, wherein said first and second bandwidth compensating means each comprise:

first delay line means for delaying signals input thereto by a phase angle $\theta$;

second delay line means connected in series with an output of said first delay line means, for delaying signals input to said second delay line means by said phase angle $\theta$;

first adder circuit means having a pair of inputs respectively in operable connection with an output of said fist delay line means and an output of said second delay line means, for adding said signals input to said first delay line means with signals output from said second delay line means;

halver-inverter circuit means in operable connection with an output of said first adder circuit means, for halving and inverting signals output from said first adder circuit;

second adder circuit means having a pair of inputs respectively in operable connection with an output of said halver-inverter circuit means and an output of said first delay line means, for adding signals output from said halver-inverter circuit means with signals output from said first delay line means;

a low pass filter in operable connection with an output of said second adder circuit means for cutting off a high band side of signals output from said second adder circuit means;

amplifier means in operable connection with an output of said low pass filter for amplifying signals output from said low pass filter; and third adder circuit means having a pair of inputs respectively in operable connection with said output of said first delay line means and an output of said amplifier means for adding signals output from said first delay line means with signals output from said amplifier means, signals output from said third adder circuit means being thereby bandwidth compensated with respect to said signals input to said first delay line means.

5. The two-dimensional bandwidth compensating circuit in accordance with claim 4, wherein said first and second delay lines each have a phase delay angle $\theta$ of approximately $\pi$ for signals input thereto at a respective Nyquist threshold frequency, said respective Nyquist threshold frequency being said first Nyquist threshold frequency for said first bandwidth compensating means while said respective Nyquist threshold frequency is said second Nyquist threshold frequency for said second bandwidth compensating means.

* * * * *